United States Patent
Yamakawa et al.

(10) Patent No.: US 10,250,171 B2
(45) Date of Patent: Apr. 2, 2019

(54) ELECTRIC MOTOR CONTROL APPARATUS AND ELECTRIC MOTOR CONTROL METHOD

(71) Applicant: TOYOTA JIDOSHA KABUSHIKI KAISHA, Toyota-shi, Aichi-ken (JP)

(72) Inventors: Toshifumi Yamakawa, Shizuoka-ken (JP); Masaki Okamura, Toyota (JP); Naoyoshi Takamatsu, Shizuoka-ken (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 207 days.

(21) Appl. No.: 14/917,810

(22) PCT Filed: Sep. 10, 2014

(86) PCT No.: PCT/IB2014/001778
§ 371 (c)(1),
(2) Date: Mar. 9, 2016

(87) PCT Pub. No.: WO2015/036835
PCT Pub. Date: Mar. 19, 2015

(65) Prior Publication Data
US 2016/0226408 A1    Aug. 4, 2016

(30) Foreign Application Priority Data
Sep. 11, 2013 (JP) .................. 2013-188219

(51) Int. Cl.
*H02P 6/14* (2016.01)
*H02P 6/10* (2006.01)
(Continued)

(52) U.S. Cl.
CPC .................. *H02P 6/10* (2013.01); *H02P 6/08* (2013.01); *H02P 27/06* (2013.01); *H02P 27/08* (2013.01); *Y02T 10/84* (2013.01)

(58) Field of Classification Search
CPC ............. H02P 5/68; H02P 23/04; H02P 21/16
See application file for complete search history.

(56) References Cited

U.S. PATENT DOCUMENTS

| | | |
|---|---|---|
| 6,023,417 A | 2/2000 | Hava et al. |
| 2012/0173066 A1* | 7/2012 | Yamada .............. B60L 11/1803 701/22 |

(Continued)

FOREIGN PATENT DOCUMENTS

| | | |
|---|---|---|
| CN | 102771044 A | 11/2012 |
| EP | 2763312 A1 | 8/2014 |

(Continued)

*Primary Examiner* — Bickey Dhakal
*Assistant Examiner* — Charles S Laughlin
(74) *Attorney, Agent, or Firm* — Hunton Andrews Kurth LLP

(57) ABSTRACT

An electric motor control apparatus controls an electric motor system that includes a power converter including switching elements and a three-phase alternating-current motor. The electric motor control apparatus includes generating devices for generating modulation signals by respectively adding corresponding triple harmonic signals to phase voltage command signals and a control device for controlling switching elements on the basis of a magnitude relation between each of the modulation signals and a carrier signal. Each of the triple harmonic signals includes a signal component that increases the absolute value of a peak value of a signal level of the corresponding modulation signal above the absolute value of a peak value of a signal level of the carrier signal in a corresponding one of phases.

8 Claims, 7 Drawing Sheets

(51) Int. Cl.
*H02P 27/06* (2006.01)
*H02P 6/08* (2016.01)
*H02P 27/08* (2006.01)

(56) References Cited

U.S. PATENT DOCUMENTS

| | | | |
|---|---|---|---|
| 2013/0307449 A1* | 11/2013 | Kobayashi | B60K 6/48 318/400.02 |
| 2014/0001990 A1 | 1/2014 | Takamatsu et al. | |
| 2014/0225547 A1 | 8/2014 | Yokozutsumi et al. | |

FOREIGN PATENT DOCUMENTS

| | | |
|---|---|---|
| JP | 2000060196 A | 2/2000 |
| JP | 2004-120853 A | 4/2004 |
| JP | 2010-263775 A | 11/2010 |
| JP | 2012023885 A | 2/2012 |
| JP | 2012135100 A | 7/2012 |
| JP | 2013059233 A | 3/2013 |
| JP | 2013110859 A | 6/2013 |
| JP | 2015-035897 A | 2/2015 |
| WO | 2013/046460 A1 | 4/2013 |
| WO | 2015/019143 A2 | 2/2015 |
| WO | 2015/025437 A1 | 2/2015 |

* cited by examiner

→NUMBER OF SWITCHING OPERATIONS = 24

ELECTRIC MOTOR CONTROL APPARATUS AND ELECTRIC MOTOR CONTROL METHOD

CROSS-REFERENCE TO RELATED APPLICATIONS

This is a national phase application based on the PCT International Patent Application No. PCT/IB2014/001778 filed Sep. 10, 2014, claiming priority to Japanese Patent Application No. 2013-188219 filed Sep. 11, 2013, the entire contents of both of which are incorporated herein by reference.

BACKGROUND OF THE INVENTION

1. Field of the Invention

The invention relates to an electric motor control apparatus that controls an electric motor system including, for example, a three-phase alternating-current motor.

2. Description of Related Art

There is pulse width modulation (PWM) control as an example of a control method to drive a three-phase alternating-current motor. In PWM control, a power converter that converts a direct-current voltage (direct-current power) to alternating-current voltages (alternating-current powers) is controlled on the basis of a magnitude relation between each of phase voltage command signals and a carrier signal having a predetermined frequency (see Japanese Patent Application Publication No. 2004-120853 (JP 2004-120853 A)). Each of the phase voltage command signals is set in terms of bringing phase currents that are supplied to the three-phase alternating-current motor into coincidence with desired values. PWM control may also be used to control a power converter that converts an alternating-current voltage to a direct-current voltage (see Japanese Patent Application Publication No. 2010-263775 (JP 2010-263775 A)).

Incidentally, a smoothing capacitor for suppressing fluctuations in direct-current voltage that is input to a power converter or that is output from the power converter is often electrically connected in parallel with the power converter. In recent years, the size of the smoothing capacitor is reduced by reducing the capacitance of the smoothing capacitor in many cases. However, if the capacitance of the smoothing capacitor is reduced, there is a concern that a ripple (so-called pulsation component) in the terminal voltage of the smoothing capacitor relatively increases. Therefore, in order to suppress (reduce) such a ripple in the terminal voltage of the smoothing capacitor, a technique for utilizing a triple harmonic signal is described in JP 2010-263775 A and JP 2004-120853 A. Specifically, JP 2010-263775 A describes a technique for controlling a switching element of the power converter such that the current waveform of an input current from an alternating-current power supply coincides with an associated wave of a sinusoidal wave having the same frequency as that of the alternating-current power supply with a triple harmonic wave of the sinusoidal wave. JP 2004-120853 A describes a technique for controlling an inverter circuit, which is an example of a power converter, by executing PWM control that uses modulated waves respectively obtained by superimposing corresponding triple harmonic waves on three-phase modulated waves.

A power converter generally converts a direct-current voltage to an alternating-current voltage by switching the states of switching elements of the power converter from an on state to an off state or from the off state to the on state. In such a power converter, there arises a loss due to switching (that is, switching operation) of the state of each of the switching elements. Thus, in the viewpoint of effectively utilizing a power converter, it is desirable to reduce the loss due to the switching operation of each switching element.

The loss due to the switching operation of each switching element increases as the number of switching operations of each switching element per unit time increases. Thus, it is possible to reduce the loss due to the switching operation of each switching element by reducing the number of switching operations of each switching element per unit time.

However, in the techniques described in JP 2010-263775 A and JP 2004-120853 A, there is a technical inconvenience that it is not possible to sufficiently reduce the number of switching operations of each switching element because a principal object is to suppress a ripple in the terminal voltage of the smoothing capacitor. Thus, there is room for improvement in terms of effectively utilizing a power converter in the techniques described in JP 2010-263775 A and JP 2004-120853 A.

SUMMARY OF THE INVENTION

The invention provides an electric motor control apparatus that is able to relatively reduce the number of switching operations of each switching element of a power converter.

An aspect of the invention provides an electric motor control apparatus. The electric motor control apparatus controls an electric motor system including a direct-current power supply, a power converter and a three-phase alternating-current motor, the power converter including switching elements that convert a direct-current power to alternating-current powers, the direct-current power being supplied from the direct-current power supply, the three-phase alternating-current motor being driven by using the alternating-current powers that are output from the power converter. The electric motor control apparatus includes a generating device configured to generate modulation signals by respectively adding corresponding triple harmonic signals to phase voltage command signals that define an operation of the three-phase alternating-current motor; and a control device configured to control an operation of the power converter by controlling the switching elements on the basis of a magnitude relation between each of the modulation signals and a carrier signal having a predetermined frequency, each of the triple harmonic signals including a signal component that is a triple harmonic signal that increases the absolute value of a peak value of a signal level of a corresponding one of the modulation signals above the absolute value of a peak value of a signal level of the carrier signal in a corresponding one of phases of the three-phase alternating-current motor.

With the electric motor control apparatus according to the aspect of the invention, it is possible to control the electric motor system. The electric motor system, on which the electric motor control apparatus executes control, includes the direct-current power supply, the power converter and the three-phase alternating-current motor. The direct-current power supply outputs a direct-current power (in other words, a direct-current voltage and a direct current). The power converter converts a direct-current power, which is supplied from the direct-current power supply, to alternating-current powers (typically, three-phase alternating-current powers). Specifically, the power converter converts a direct-current power to alternating-current powers by switching the states of the switching elements of the power converter (for example, switching from an on state to an off state or from the off state to the on state) under control of the control device (described later). As a result, the three-phase alternating-current motor is driven by using the alternating-current powers that are supplied from the power converter to the three-phase alternating-current motor.

The electric motor system may include a smoothing capacitor. The smoothing capacitor may be electrically connected in parallel with the power converter. Typically, the smoothing capacitor may be electrically connected in parallel with the direct-current power supply. In this case, the smoothing capacitor is able to suppress fluctuations in the terminal voltage of the smoothing capacitor (that is, the terminal voltage of each of the direct-current power supply and the power converter).

In order to control the above electric motor system, the electric motor control apparatus includes the generating device and the control device.

The generating device generates modulation signals by respectively adding the corresponding triple harmonic signals to the phase voltage command signals. That is, the generating device adds the corresponding triple harmonic signals to the phase voltage command signals corresponding to the phases (that is, the three phases formed of U phase, V phase and W phase) of the three-phase alternating-current motor. As a result, the generating device generates the modulation signals corresponding to the phases (that is, the three phases of U phase, V phase and W phase) of the three-phase alternating-current motor.

The phase voltage command signals are alternating-current signals that define the operation of the three-phase alternating-current motor. For example, the phase voltage command signals may be set as needed in terms of bringing torque, which is output from the three-phase alternating-current motor, into coincidence with a desired value.

Each of the triple harmonic signals is a signal (typically, an alternating-current signal) having a frequency that is three times as high as the frequency of a corresponding one of the phase voltage command signals. A common triple harmonic signal that is shared among all the three phases of the three-phase alternating-current motor may be used as each of the triple harmonic signals. In this case, the common triple harmonic signal may be added to the phase voltage command signal of each phase. Alternatively, triple harmonic signals individually prepared for the three phases of the three-phase alternating-current motor may be used as the triple harmonic signals. In this case, the triple harmonic signals corresponding to the respective phases may be added to the phase voltage command signals of the respective phases.

The control-device controls the operation of the power converter by using the modulation signals generated by the generating device. Specifically, the control device may control an operation of the power converter by controlling the switching elements on the basis of a magnitude relation between each of the modulation signals and a carrier signal having a predetermined frequency. As a result, the power converter supplies the three-phase alternating-current motor with alternating-current powers based on the phase voltage command signals. Thus, the three-phase alternating-current motor is driven in accordance with a mode based on the phase voltage command signals.

In the electric motor control apparatus according to the aspect of the invention, particularly, each of the triple harmonic signals may include a signal component that is a triple harmonic signal that increases the absolute value of a peak value of a signal level of a corresponding one of the modulation signals above the absolute value of a peak value of a signal level of the carrier signal in a corresponding one of phases of the three-phase alternating-current motor. That is, each of the triple harmonic signals is a triple harmonic signal that functions to increase the absolute value of the peak value of the signal level of a corresponding one of the modulation signals above the absolute value of the peak value of the signal level of the carrier signal in a corresponding one of the phases of the three-phase alternating-current motor. In other words, each of the triple harmonic signals includes a signal component that functions to increase the maximum amplitude of a corresponding one of the modulation signals above the maximum amplitude of the carrier signal. That is, each of the triple harmonic signals is a triple harmonic signal that functions to increase the maximum amplitude of a corresponding one of the modulation signals above the maximum amplitude of the carrier signal. For example, even when the absolute value of the peak value of the signal level of each of the phase voltage command signals is not larger than the absolute value of the peak value of the signal level of the carrier signal, the absolute value of the peak value of the signal level of a corresponding one of the modulation signals becomes larger than the absolute value of the peak value of the signal level of the carrier signal by adding the corresponding triple harmonic signal to that phase voltage command signal.

For example, each of the triple harmonic signals may include a signal component that functions to increase the absolute value of the peak value of the signal level of a corresponding one of the modulation signals above the absolute value of the peak value of the signal level of the carrier signal at least at timing at which the absolute value of the signal level of the phase voltage command signal is maximum in a corresponding one of the phases. In other words, each of the triple harmonic signals may include at least a signal component that increases the absolute value of the peak value of the signal level of a corresponding one of the modulation signals above the absolute value of the peak value of the signal level of the carrier signal at the timing at which the absolute value of the signal level of the phase voltage command signal is maximum in a corresponding one of the phases.

As described above, the control device controls the switching elements of the power converter on the basis of a magnitude relation between each of the modulation signals and the carrier signal. Specifically, the control device controls the switching elements such that the state of each switching element switches on the basis of a magnitude relation between the corresponding modulation signal and the carrier signal. For example, the control device controls the switching elements such that the state of each switching element switches at the timing of shifting from a first state of a magnitude relation between the corresponding modulation signal and the carrier signal (for example, state where the signal level of the corresponding modulation signal is lower than the signal level of the carrier signal) to a second state (for example, the signal level of the corresponding modulation signal is higher than the signal level of the carrier signal). Similarly, the control device controls the switching elements such that the state of each switching element switches at the timing of shifting from the second state of a magnitude relation between the corresponding modulation signal and the carrier signal to the first state. Thus, as the number of times the magnitude relation between the corresponding modulation signal and the carrier signal shifts from the first state to the second state and the number of times the magnitude relation shifts from the second state to the first state increase, the number of times the state of each switching element switches (that is, the number of switching operations of each switching element) increases.

In the electric motor control apparatus according to the aspect of the invention, because each modulation signal is generated by adding the corresponding triple harmonic signal including the above-described signal component, so the absolute value of the peak value of the signal level of each modulation signal is larger than the absolute value of the peak value of the signal level of the carrier signal. Thus, in the electric motor control apparatus according to the aspect of the invention, as will be described in detail with reference to the drawings later, the number of times the magnitude relation between each modulation signal and the carrier signal shifts reduces in comparison with the case where each modulation signal is generated without adding the corresponding triple harmonic signal including the above-described signal component. As a result, in the electric motor control apparatus according to the aspect of the invention, the number of switching operations of each switching element also decreases in comparison with the case where each modulation signal is generated without adding the corresponding triple harmonic signal including the above-described signal component. Thus, in the electric motor control apparatus according to the aspect of the invention, a loss due to the switching operation of each switching element decreases in comparison with the case where each modulation signal is generated without adding the corresponding triple harmonic signal including the above-described signal component.

In this way, the electric motor control apparatus according to the aspect of the invention is able to relatively reduce the number of switching operations of each of the switching elements of the power converter. As a result, it is possible to relatively reduce a loss due to the switching operation of each of the switching elements of the power converter.

In the electric motor control apparatus according to the aspect of the invention, each of the triple harmonic signals may include a signal component of which (i) the absolute value of the signal level is larger than zero and (ii) the polarity of the signal level is the same as the polarity of the phase voltage command signal of an intended phase, at timing at which the absolute value of the signal level of the phase voltage command signal of the intended phase is maximum.

With the above configuration, the electric motor control apparatus is able to relatively reduce the number of switching operations of each of the switching elements of the power converter by adding each triple harmonic signal including such a signal component to a corresponding one of the phase voltage command signals.

In the electric motor control apparatus according to the aspect of the invention, each of the triple harmonic signals may include a signal component of which (i) the absolute value of a signal level is maximum and (ii) the polarity of the signal level is the same as the polarity of the phase voltage command signal of an intended phase, at timing at which the absolute value of the signal level of the phase voltage command signal of the intended phase is maximum.

With the above configuration, the electric motor control apparatus is able to relatively reduce the number of switching operations of each of the switching elements of the power converter by adding each triple harmonic signal including such a signal component to a corresponding one of the phase voltage command signals.

In the electric motor control apparatus according to the aspect of the invention, each of the triple harmonic signal may include at least one of (i) a first signal component of which (i-1) the absolute value of a signal level is maximum and (i-2) the polarity of the signal level is the same as the polarity of the phase voltage command signal of an intended phase, at timing at which the absolute value of the signal level of the phase voltage command signal of the intended phase is maximum, and (ii) a second signal component that is obtained by shifting the phase of the first signal component by $X°$ (where $-90<X<90$).

With the above configuration, the electric motor control apparatus is able to relatively reduce the number of switching operations of each of the switching elements of the power converter by adding each triple harmonic signal including at least one of such a first signal component and a second signal component to a corresponding one of the phase voltage command signals.

In the electric motor control apparatus according to the aspect of the invention, the electric motor system may be mounted on a vehicle, and the generating device may generate each modulation signal by adding the corresponding triple harmonic signal to the corresponding phase voltage command signal when an output of the three-phase alternating-current motor, which is required to propel the vehicle, is lower than or equal to a predetermined value.

When each triple harmonic signal including the signal component that increases the absolute value of the peak value of the signal level of a corresponding one of the modulation signals above the absolute value of the peak value of the signal level of the carrier signal is added, a ripple in the terminal voltage of the smoothing capacitor may relatively increase in comparison with the case where each triple harmonic signal including the signal component that increases the absolute value of the peak value of the signal level of a corresponding one of the modulation signals above the absolute value of the peak value of the signal level of the carrier signal is not added. Thus, in the above configuration, when an increase in a ripple in the terminal voltage of the smoothing capacitor is less likely to become large influence (that is, when the output of the three-phase alternating-current motor, required to propel the vehicle, is lower than or equal to a predetermined value), each triple harmonic signal that increases the absolute value of the peak value of the signal level of a corresponding one of the modulation signals above the absolute value of the peak value of the signal level of the carrier signal is added. Thus, the above-described various advantageous effects are obtained while the influence due to an increase in a ripple in the terminal voltage of the smoothing capacitor is suppressed.

The generating device may generate each modulation signal by adding the corresponding triple harmonic signal that does not include a signal component that increases the absolute value of the peak value of the signal level of the modulation signal above the absolute value of the peak value of the signal level of the carrier signal to the corresponding phase voltage command signal when the output of the three-phase alternating-current motor, required to propel the vehicle, is not lower than or equal to the predetermined value. For example, when the output of the three-phase alternating-current motor, required to propel the vehicle, is not lower than or equal to the predetermined value, the generating device may generate each modulation signal by adding the corresponding triple harmonic signal to the corresponding phase voltage command signal, the corresponding triple harmonic signal including a signal component of which (i) the absolute value of the signal level is larger than zero and (ii) the polarity of the signal level is opposite to the polarity of the corresponding phase voltage command signal of an intended phase, at timing at which the absolute value of the signal level of the corresponding phase voltage command signal of the intended phase is maximum. Alternatively, for example, when the output of the three-phase alternating-current motor, required to propel the vehicle, is not lower than or equal to the predetermined value, the generating device may generate each modulation signal by adding the corresponding triple harmonic signal to the corresponding phase voltage command signal, the corresponding triple harmonic signal including a signal component of which (i) the absolute value of the signal level is maximum and (ii) the polarity of the signal level is opposite to the polarity of the corresponding phase voltage command signal of an intended phase, at timing at which the absolute value of the signal level of the corresponding phase voltage command signal of the intended phase.

In the electric motor control apparatus according to the aspect of the invention, the electric motor system may be mounted on a vehicle, and the generating device may generate each modulation signal by adding the corresponding triple harmonic signal to the corresponding phase voltage command signal when the vehicle is traveling in a fuel economy drive mode in which fuel economy performance is given a higher priority than driving performance.

When each triple harmonic signal including the signal component that increases the absolute value of the peak value of the signal level of a corresponding one of the modulation signals above the absolute value of the peak value of the signal level of the carrier signal is added, a ripple in the terminal voltage of the smoothing capacitor may relatively increase in comparison with the case where each triple harmonic signal including the signal component that increases the absolute value of the peak value of the signal level of a corresponding one of the modulation signals above the absolute value of the peak value of the signal level of the carrier signal is not added. Thus, in the above configuration, when an increase in a ripple in the terminal voltage of the smoothing capacitor is less likely to become large influence (that is, when the vehicle is travelling in a fuel economy drive mode), each triple harmonic signal that increases the absolute value of the peak value of the signal level of a corresponding one of the modulation signals above the absolute value of the peak value of the signal level of the carrier signal is added. Thus, the above-described various advantageous effects are obtained while the influence due to an increase in a ripple in the terminal voltage of the smoothing capacitor is suppressed.

The generating device may generate each modulation signal by adding the corresponding triple harmonic signal that does not include a signal component that increases the absolute value of the peak value of the signal level of the modulation signal above the absolute value of the peak value of the signal level of the carrier signal to the corresponding phase voltage command signal when the vehicle is traveling in a drive mode different from the fuel economy drive mode (for example, sporty drive mode that gives a higher priority to driving performance over fuel economy performance). For example, when the vehicle traveling in a drive mode different from the fuel economy drive mode, the generating device may generate each modulation signal by adding the corresponding triple harmonic signal to the corresponding phase voltage command signal, the corresponding triple harmonic signal including a signal component of which (i) the absolute value of the signal level is larger than zero and (ii) the polarity of the signal level is opposite to the polarity of the corresponding phase voltage command signal of an intended phase, at timing at which the absolute value of the signal level of the corresponding phase voltage command signal of the intended phase is maximum. For example, when the vehicle traveling in a drive mode different from the fuel economy drive mode, the generating device may generate each modulation signal by adding the corresponding triple harmonic signal to the corresponding phase voltage command signal, the corresponding triple harmonic signal including a signal component of which (i) the absolute value of the signal level is maximum and (ii) the polarity of the signal level is opposite to the polarity of the corresponding phase voltage command signal of an intended phase, at timing at which the absolute value of the signal level of the corresponding phase voltage command signal of the intended phase is maximum.

In a situation that the vehicle is traveling in the fuel economy drive mode, it may be regarded as substantially an example of a situation that the output of the three-phase alternating-current motor, required to propel the vehicle, is lower than or equal to the predetermined value. That is, when the vehicle is traveling in the fuel economy drive mode, it may be estimated that the output of the three-phase alternating-current motor, required to propel the vehicle, is lower than or equal to the predetermined value.

The electric motor control apparatus according to the aspect of the invention may further include a adjusting device configured to adjust a characteristic of each of the triple harmonic signals such that the absolute value of the peak value of the signal level of the corresponding modulation signal is larger than the absolute value of the peak value of the signal level of the carrier signal in a corresponding one of phases of the three-phase alternating-current motor.

With the above configuration, the electric motor control apparatus is able to generate each triple harmonic signal including a signal component that increases the absolute value of the peak value of the signal level of a corresponding one of the modulation signals above the absolute value of the peak value of the signal level of the carrier signal by adjusting (for example, dynamically, sequentially or previously adjusting) the characteristic of the triple harmonic signal.

In the electric motor control apparatus that further includes the adjusting device, the characteristic of each of the triple harmonic signals may include at least one of the phase and amplitude of the triple harmonic signal.

With the above configuration, the electric motor control apparatus is able to generate each triple harmonic signal including a signal component that increases the absolute value of the peak value of the signal level of a corresponding one of the modulation signals above the absolute value of the peak value of the signal level of the carrier signal by adjusting at least one of the phase and amplitude of the triple harmonic signal.

The operation and other advantages of the invention become apparent from the following embodiment described below.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Hereinafter, an embodiment of an electric motor control apparatus will be described.

(1) Configuration of Vehicle

Figure 1:
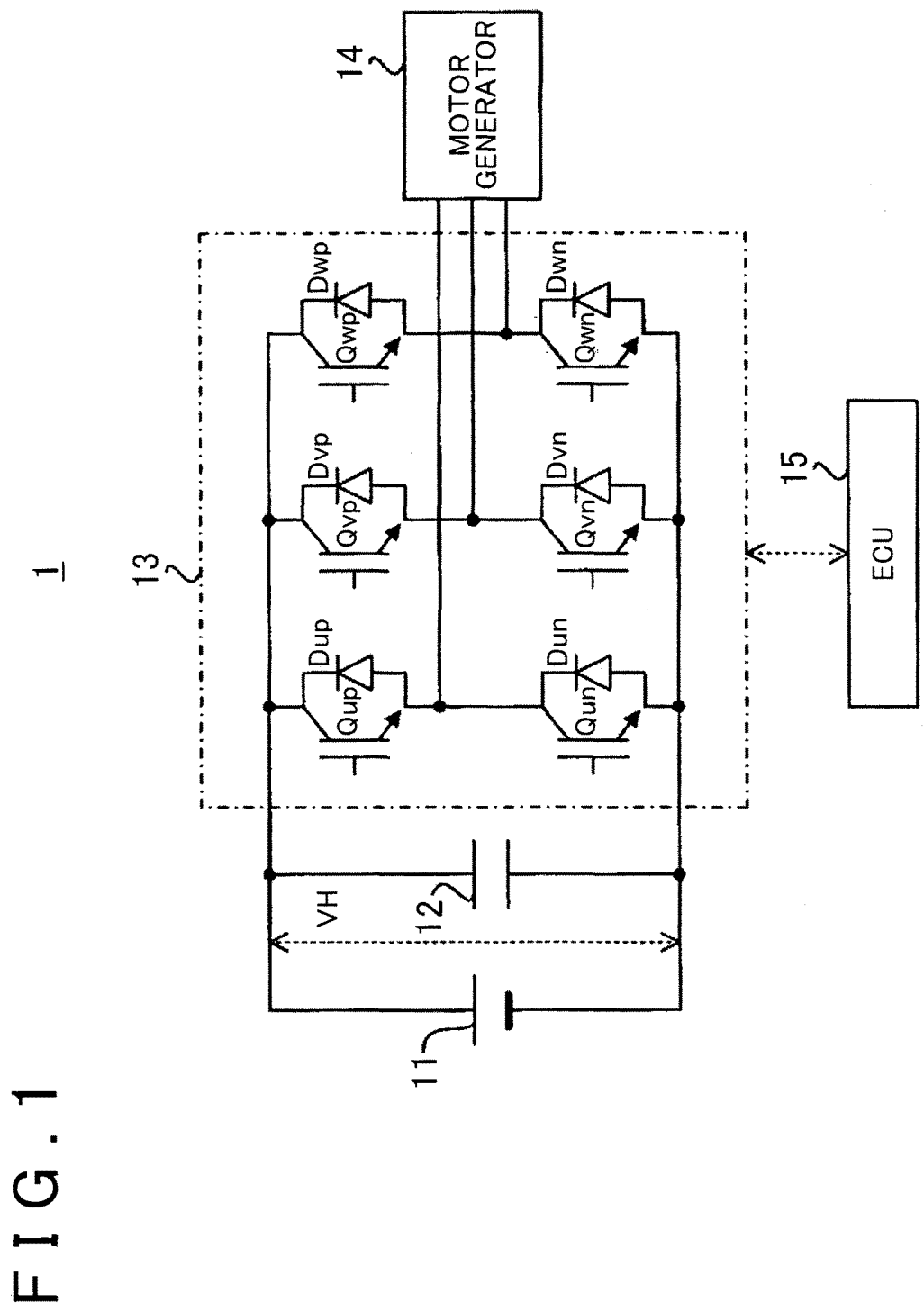
FIG. 1 is a block diagram that shows the configuration of a vehicle.

The configuration of a vehicle 1 will be described with reference to FIG. 1. FIG. 1 is a block diagram that shows the configuration of the vehicle 1.

As shown in FIG. 1, the vehicle 1 includes a direct-current power supply 11, a smoothing capacitor 12, an inverter 13, a motor generator 14, and an electronic control unit (ECU) 15. The inverter 13 is an example of a "power converter". The motor generator 14 is an example of a "three-phase alternating-current motor". The ECU 15 is an example of an "electric motor control apparatus".

The direct-current power supply 11 is a rechargeable electrical storage device. For example, a secondary battery (such as a nickel-metal hydride battery and a lithium ion battery) and a capacitor (such as an electric double layer capacitor and a large-capacitance capacitor) are illustrated as an example of the direct-current power supply 11.

The smoothing capacitor 12 is a voltage smoothing capacitor connected between a positive electrode line of the direct-current power supply 11 and a negative electrode line of the direct-current power supply 11. That is, the smoothing capacitor 12 is a capacitor for smoothing fluctuations in a terminal voltage VH between the positive electrode line and the negative electrode line.

The inverter 13 converts a direct-current power (direct-current voltage), which is supplied from the direct-current power supply 11, to alternating-current powers (three-phase alternating-current voltages). In order to convert a direct-current power (direct-current voltage) to alternating-current powers (three-phase alternating-current voltages), the inverter 13 includes a U-phase arm, a V-phase arm and a W-phase arm. The U-phase arm includes a p-side switching element Qup and an n-side switching element Qun. The V-phase arm includes a p-side switching element Qvp and an n-side switching element Qvn. The W-phase arm includes a p-side switching element Qwp and an n-side switching element Qwn. The arms of the inverter 13 are connected in parallel with each other between the positive electrode line and the negative electrode line. The p-side switching element Qup and the n-side switching element Qun are connected in series with each other between the positive electrode line and the negative electrode line. This also applies to the pair of p-side switching element Qvp and n-side switching element Qvn and the pair of p-side switching element Qwp and n-side switching element Qwn. A rectifier diode Dup is connected to the p-side switching element Qup. The rectifier diode Dup flows current from the emitter terminal of the p-side switching element Qup to the collector terminal of the p-side switching element Qup. Similarly, a rectifier diode Dun to a rectifier diode Dwn are respectively connected to the n-side switching element Qun to the n-side switching element Qwn. A neutral point between the upper arm (that is, each p-side switching element) and lower arm (that is, each n-side switching element) of each phase arm in the inverter 13 is connected to a corresponding one of phase coils of the motor generator 14. As a result, alternating-current powers (three-phase alternating-current voltages) that are generated as a result of conversion operation of the inverter 13 are supplied to the motor generator 14.

The motor generator 14 is a three-phase alternating-current motor generator. The motor generator 14 is driven to generate torque required to propel the vehicle 1. Torque generated by the motor generator 14 is transmitted to a drive wheel via a drive shaft mechanically coupled to the rotary shaft of the motor generator 14. The motor generator 14 may regenerate (generate) electric power during braking of the vehicle 1.

The ECU 15 is an electronic control unit for controlling the operation of the vehicle 1. Particularly, in the present embodiment, the ECU 15 executes inverter control operation for controlling the operation of the inverter 13. The inverter control operation executed by the ECU 15 will be described in detail later (see FIG. 3, FIG. 4, and the like).

Figure 2:
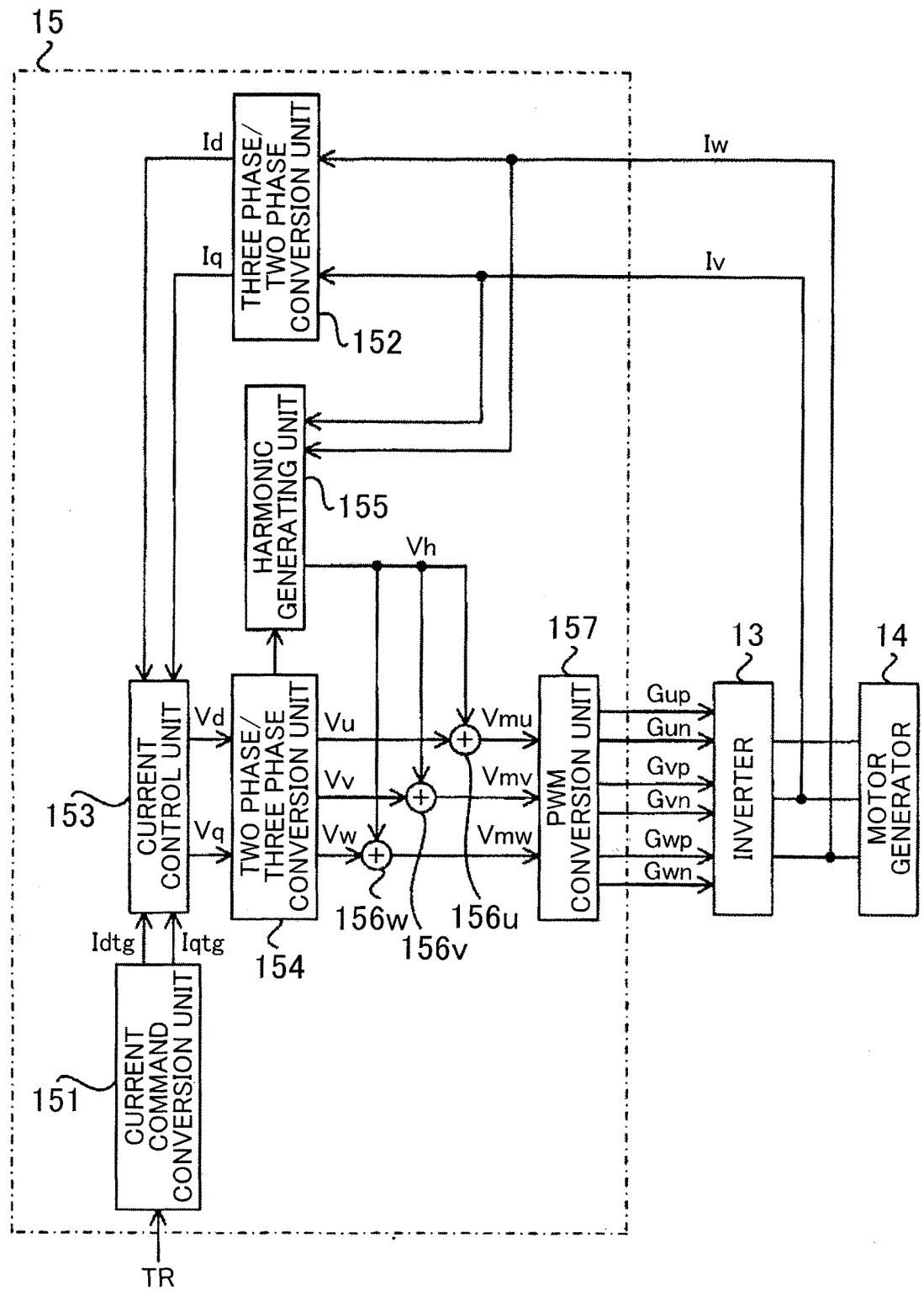
FIG. 2 is a block diagram that shows the configuration of an ECU (particularly, the configuration of the ECU for controlling the operation of an inverter)

The configuration of the ECU 15 (particularly, the configuration of the ECU 15 for controlling the operation of the inverter 13) will be described with reference to FIG. 2. FIG. 2 is a block diagram that shows the configuration of the ECU 15 (particularly, the configuration of the ECU 15 for controlling the operation of the inverter 13).

As shown in FIG. 2, the ECU 15 includes a current command conversion unit 151, a three phase/two phase conversion unit 152, a current control unit 153, a two phase/three phase conversion unit 154, a harmonic generating unit 155, an adder 156u, an adder 156v, an adder 156w, and a pulse width modulation (PWM) conversion unit 157. The harmonic generating unit 155 is an example of an "adjusting device". The adder 156u is an example of a "generating device". The adder 156v is an example of the "generating device". The adder 156w is an example of the "generating device". The PWM conversion unit 157 is an example of a "control device".

The current command conversion unit 151 generates two-phase current command signals (that is, a d-axis current command signal Idtg and a q-axis current command signal Iqtg) on the basis of a torque command value TR of the three-phase alternating-current motor 14. The current command conversion unit 151 outputs the d-axis current command signal Idtg and the q-axis current command signal Iqtg to the current control unit 153.

The three phase/two phase conversion unit 152 acquires a V-phase current Iv and a W-phase current Iw as feedback information from the inverter 13. The three phase/two phase conversion unit 152 may acquire at least two of a U-phase current Iu, the V-phase current Iv and the W-phase current Iw from the inverter 13. The three phase/two phase conversion unit 152 converts the V-phase current Iv and the W-phase current Iw to a d-axis current Id and a q-axis current Iq. The V-phase current Iv and the W-phase current Iw correspond to three-phase current values. The d-axis current Id and the q-axis current Iq correspond to two-phase current values. The three phase/two phase conversion unit 152 outputs the d-axis current Id and the q-axis current Iq to the current control unit 153.

The current control unit 153 generates a d-axis voltage command signal Vd and a q-axis voltage command signal Vq on the basis of a difference between the d-axis current command signal Idtg and the d-axis current Id and a difference between the q-axis current command signal Iqtg and the q-axis current Iq. The d-axis voltage command signal Vd and the q-axis voltage command signal Vq correspond to two-phase voltage command signals. The d-axis current command signal Idtg is output from the current command conversion unit 151. The d-axis current Id is output from the three phase/two phase conversion unit 152. The q-axis current command signal Iqtg is output from the current command conversion unit 151. The q-axis current Iq is output from the three phase/two phase conversion unit 152. At this time, the current control unit 153 may generate the d-axis voltage command signal Vd and the q-axis voltage command signal Vq by using, for example, proportional integral (PI) control or proportional integral derivative (PID) control. The current control unit 153 outputs the d-axis voltage command signal Vd and the q-axis voltage command signal Vq to the two phase/three phase conversion unit 154.

The two phase/three phase conversion unit 154 converts the d-axis voltage command signal Vd and the q-axis voltage command signal Vq to a U-phase voltage command signal Vu, a V-phase voltage command signal Vv and a W-phase voltage command signal Vw that are three-phase voltage command signals. The two phase/three phase conversion unit 154 outputs the U-phase voltage command signal Vu to the adder 156*u*. Similarly, the two phase/three phase conversion unit 154 outputs the V-phase voltage command signal Vv to the adder 156*v*. Similarly, the two phase/three phase conversion unit 154 outputs the W-phase voltage command signal Vw to the adder 156*w*.

The harmonic generating unit 155 generates triple harmonic signals each having a frequency that is three times as high as the frequency of a corresponding one of the three-phase voltage command signals (that is, the U-phase voltage command signal Vu, the V-phase voltage command signal Vv and the W-phase voltage command signal Vw) and a corresponding one of the three-phase current values (that is, U-phase current Iu, the V-phase current Iv and the W-phase current Iw). Particularly, in the present embodiment, the harmonic generating unit 155 generates two-type triple harmonic signals Vh1, Vh2. However, the harmonic generating unit 155 may generate only the triple harmonic signal Vh2, and does not necessarily generate the triple harmonic signal Vh1. The two-type triple harmonic signals Vh1, Vh2 will be described in detail later (see FIG. 3 and FIG. 4).

The adder 156*u* adds one of the two-type triple harmonic signals Vh1, Vh2, which are generated by the harmonic generating unit 155, to the U-phase voltage command signal Vu that is output from the two phase/three phase conversion unit 154. As a result, the adder 156*u* generates a U-phase modulation signal Vmu (=Vu+Vh1 or Vu+Vh2). The adder 156*u* outputs the U-phase modulation signal Vmu to the PWM conversion unit 157.

The adder 156*v* adds one of the two-type triple harmonic signals Vh1, Vh2, which are generated by the harmonic generating unit 155, to the V-phase voltage command signal Vv that is output from the two phase/three phase conversion unit 154. As a result, the adder 156*v* generates a V-phase modulation signal Vmv (=Vv+Vh1 or Vv+Vh2). The adder 156*v* outputs, the V-phase modulation signal Vmv to the PWM conversion unit 157.

The adder 156*w* adds one of the two-type triple harmonic signals Vh1, Vh2, which are generated by the harmonic generating unit 155, to the W-phase voltage command signal Vw that is output from the two phase/three phase conversion unit 154. As a result, the adder 156*w* generates a W-phase modulation signal Vmw (=Vw+Vh1 or Vw+Vh2). The adder 156*w* outputs the W-phase modulation signal Vmw to the PWM conversion unit 157.

The PWM conversion unit 157 generates a U-phase PWM signal Gup for driving the p-side switching element Qup and a U-phase PWM signal Gun for driving the n-side switching element Qun on the basis of a magnitude relation between the U-phase modulation signal Vmu and a carrier signal C having a predetermined carrier frequency f. For example, the PWM conversion unit 157 may generate the U-phase PWM signals Gup, Gun for setting the p-side switching element Qup to the on state when the U-phase modulation signal Vmu in a state smaller than the carrier signal C coincides with the carrier signal C. On the other hand, for example, the PWM conversion unit 157 generates the U-phase PWM signals Gup, Gun for setting the n-side switching element Qun to the on state when the U-phase modulation signal Vmu in a state larger than the carrier signal C coincides with the carrier signal C. The PWM conversion unit 157 outputs the U-phase PWM signals Gup, Gun to the inverter 13. As a result, the inverter 13 (particularly, the p-side switching element Qup and the n-side switching element Qun that constitute the U-phase arm of the inverter 13) operates on the basis of the U-phase PWM signals Gup, Gun.

Furthermore, the PWM conversion unit 157 generates a V-phase PWM signal Gyp for driving the p-side switching element Qvp and a V-phase PWM signal Gvn for driving the n-side switching element Qvn on the basis of a magnitude relation between the V-phase modulation signal Vmv and the carrier signal C. In addition, the PWM conversion unit 157 generates a W-phase PWM signal Gwp for driving the p-side switching element Qwp and a W-phase PWM signal Gwn for driving the n-side switching element Qwn on the basis of a magnitude relation between the W-phase modulation signal Vmw and the carrier signal C. A mode in which the V-phase PWM signals Gyp, Gvn and the W-phase PWM signals Gwp, Gwn are generated is the same as the mode in which the U-phase PWM signals Gup, Gun are generated.

(2) Flow of Inverter Control Operation

Figure 3:
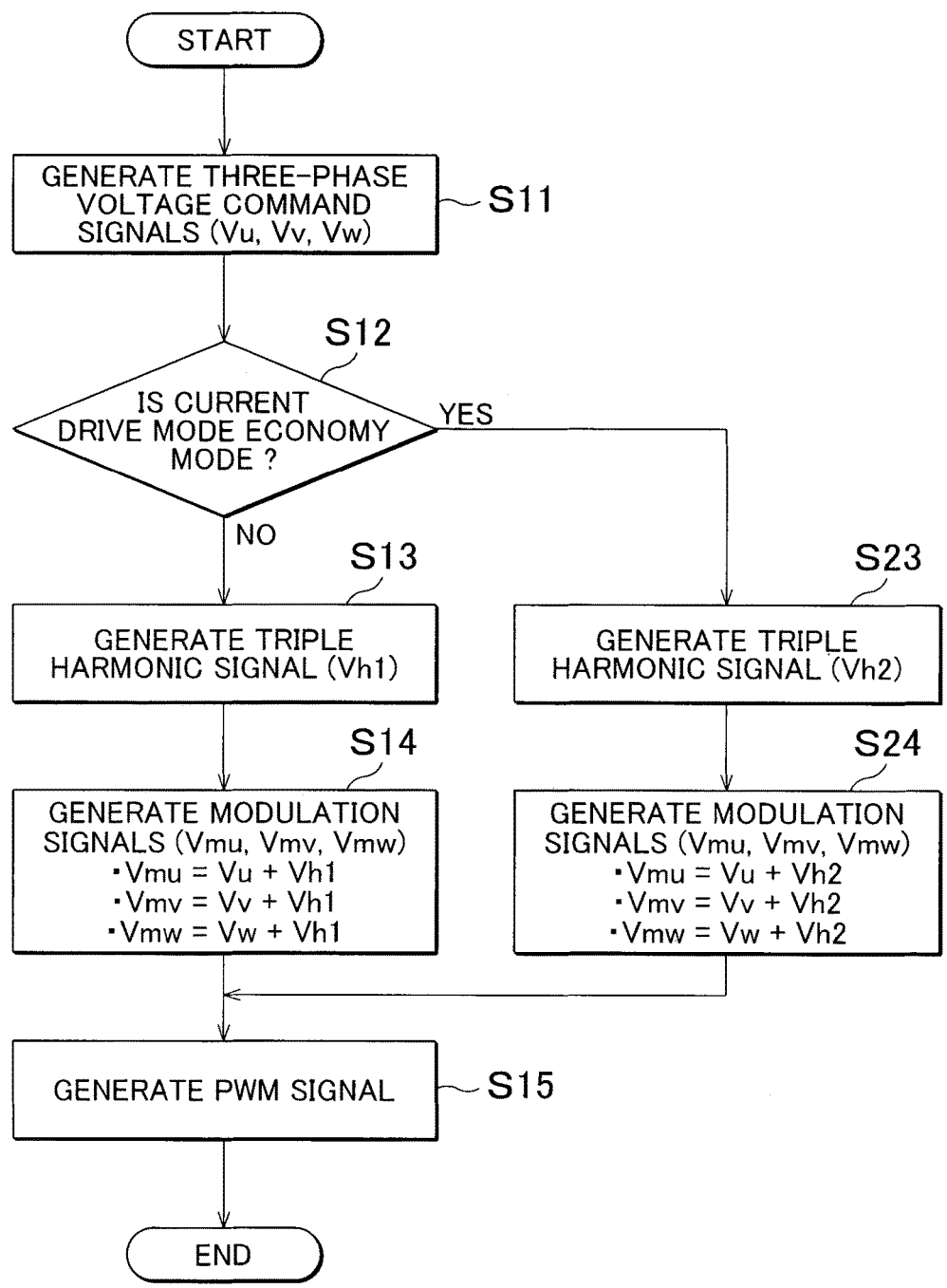
FIG. 3 is a flowchart that shows the flow of inverter control operation.

Next, the flow of inverter control operation that is executed in the vehicle 1 (that is, inverter control operation that is executed by the ECU 15) will be described with reference to FIG. 3. FIG. 3 is a flowchart that shows the flow of inverter control operation.

As shown in FIG. 3, the two phase/three phase conversion unit 154 generates the three-phase voltage command signals (that is, the U-phase voltage command signal Vu, the V-phase voltage command signal Vv and the W-phase voltage command signal Vw) (step S11). The method of generating the three-phase voltage command signals is as described above with reference to FIG. 2.

In parallel with or before or after the operation of step S11, the ECU 15 determines whether the current drive mode of the vehicle 1 is an economy mode (step S12). The economy mode is a drive mode in which improvement in fuel economy performance (for example, a reduction in fuel consumption) is given a higher priority than improvement in traveling performance (for example, improvement in driving response or a reduction in noise vibration harshness (NVH)).

In step S12, the ECU 15 may determine whether the output (that is, power) of the three-phase alternating-current motor 14 is lower than or equal to a predetermined value in addition to or instead of determining whether the current drive mode of the vehicle 1 is the economy mode. For example, the ECU 15 may determine whether the output of the three-phase alternating-current motor 14 that is used to propel the vehicle 1 is lower than or equal to a predetermined value. When it is determined that the output of the three-phase alternating-current motor 14 is lower than or equal to the predetermined value, the following operation may be executed in a similar mode to the case where it is determined that the current drive mode of the vehicle 1 is the economy mode.

When it is determined that the current drive mode of the vehicle 1 is not the economy mode (No in step S12) as a result of determination of step S12, the harmonic generating unit 155 generates the triple harmonic signal Vh1 (step S13).

After that, the adder 156u adds the triple harmonic signal Vh1 generated in step S13 to the U-phase voltage command signal Vu generated in step S11. As a result, the adder 156u generates the U-phase modulation signal Vmu (=Vu+Vh1) (step S14). The adder 156v also similarly generates the V-phase modulation signal Vmv (=Vv+Vh1) (step S14). The adder 156w also similarly generates the W-phase modulation signal Vmw (=Vw+Vh1) (step S14).

On the other hand, when it is determined that the current drive mode of the vehicle 1 is the economy mode (Yes in step S12) as a result of determination of step S12, the harmonic generating unit 155 generates the triple harmonic signal Vh2 having a characteristic different from that of the triple harmonic signal Vh1 (step S23).

After that, the adder 156u adds the triple harmonic signal Vh2 generated in step S23 to the U-phase voltage command signal Vu generated in step S11. As a result, the adder 156u generates the U-phase modulation signal Vmu (=Vu+Vh2) (step S24). The adder 156v also similarly generates the V-phase modulation signal Vmv (=Vv+Vh2) (step S24). The adder 156w also similarly generates the W-phase modulation signal Vmw (=Vw+Vh2) (step S24).

Figure 4:
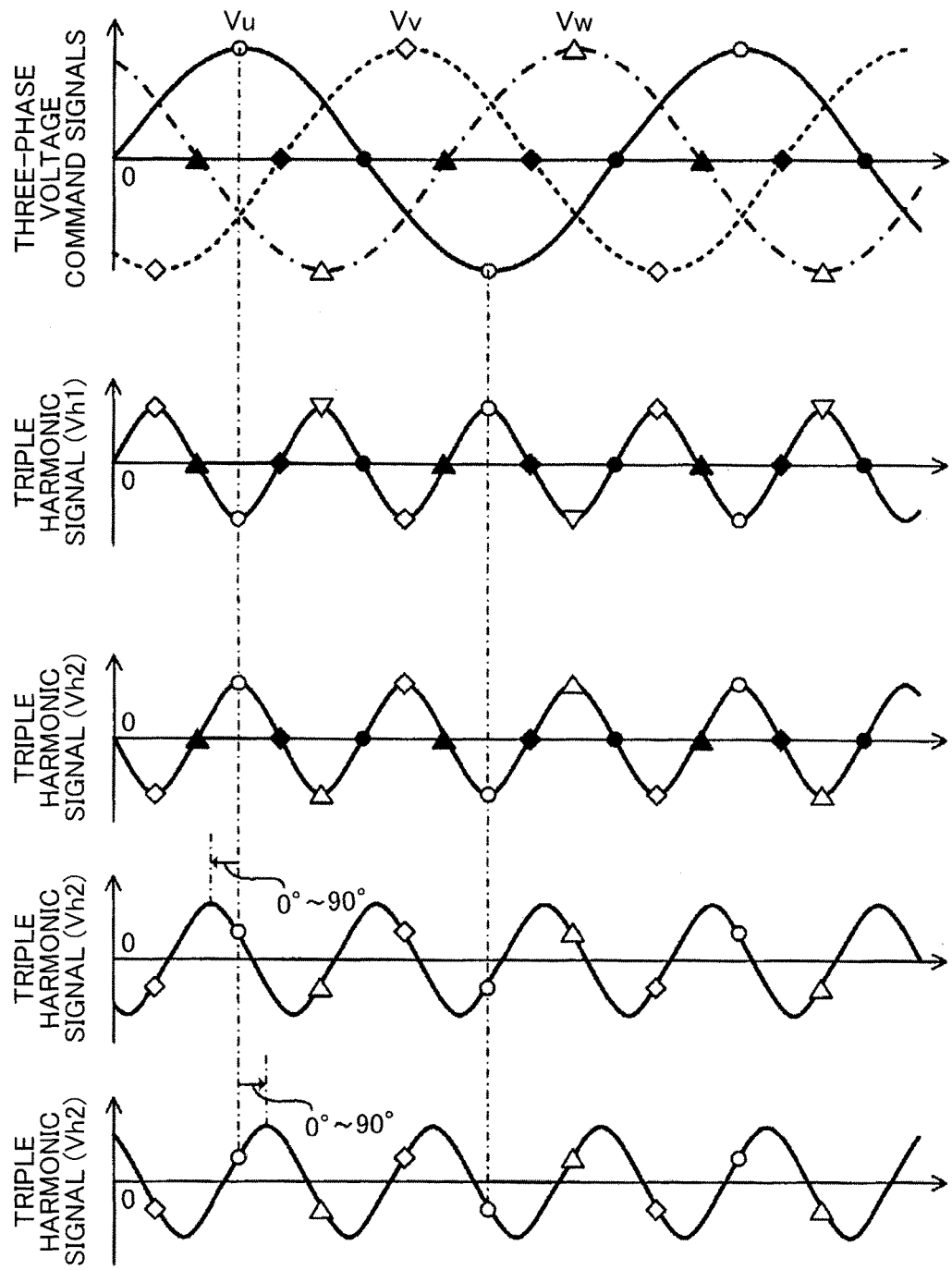
FIG. 4 is a graph that shows triple harmonic signals together with three-phase voltage command signals.

The triple harmonic signals Vh1, Vh2 will be described with reference to FIG. 4. FIG. 4 is a graph that shows the triple harmonic signals Vh1, Vh2 together with the three-phase voltage command signals.

Initially, the triple harmonic signal Vh1 will be described. As shown in the second top graph in FIG. 4, the triple harmonic signal Vh1 is a triple harmonic signal of which the absolute value of the signal level is minimum at the timing at which the absolute value of the signal level of any one of the U-phase voltage command signal Vu, the V-phase voltage command signal Vv and the W-phase voltage command signal Vw (see the top graph in FIG. 4) is minimum. In other words, the triple harmonic signal Vh1 is a triple harmonic signal that satisfies a condition that a phase at which the absolute value of the signal level of any one of the U-phase-voltage command signal Vu, the V-phase voltage command signal Vv and the W-phase voltage command signal Vw is minimum coincides with a phase at which the absolute value of the signal level of the triple harmonic signal Vh1 is minimum. That is, the triple harmonic signal Vh1 is a triple harmonic signal of which the absolute value of the signal level is minimum at the timing at which the absolute value of the signal level of at least one phase voltage command signal is minimum.

For example, the triple harmonic signal Vh1 may be a triple harmonic signal of which the signal level is zero at the timing at which the signal level of any one of the U-phase voltage command signal Vu, the V-phase voltage command signal Vv and the W-phase voltage command signal Vw is zero. In other words, the triple harmonic signal Vh1 may be a triple harmonic signal that satisfies a condition that a phase at which the signal level of any one of the U-phase voltage command signal Vu, the V-phase voltage command signal Vv and the W-phase voltage command signal Vw is zero coincides with a phase at which the signal level of the triple harmonic signal Vh1 is zero.

In the example shown in the second top graph in FIG. 4, for example, the signal level of the triple harmonic signal Vh1 is zero at the timing (see black circles in FIG. 4) at which the signal level of the U-phase voltage command signal Vu is zero. Similarly, the signal level of the triple harmonic signal Vh1 is zero at the timing (see black squares in FIG. 4) at which the signal level of the V-phase voltage command signal Vv is zero. Similarly, the signal level of the triple harmonic signal Vh1 is zero at the timing (see the black triangle in FIG. 4) at which the signal level of the W-phase voltage command signal Vw is zero.

In addition, the triple harmonic signal Vh1 is a triple harmonic signal of which the absolute value of the signal level is maximum at the timing at which the absolute value of the signal level of any one of the U-phase voltage command signal Vu, the V-phase voltage command signal Vv and the W-phase voltage command signal Vw (see the top graph in FIG. 4) is maximum. In other words, the triple harmonic signal Vh1 is a triple harmonic signal that satisfies a condition that a phase at which the absolute value of the signal level of any one of the U-phase voltage command signal Vu, the V-phase voltage command signal Vv and the W-phase voltage command signal Vw is maximum coincides with a phase at which the absolute value of the signal level of the triple harmonic signal Vh1 is maximum. That is, the triple harmonic signal Vh1 is a triple harmonic signal of which the absolute value of the signal level is maximum at the timing at which the absolute value of the signal level of at least one phase voltage command signal is maximum.

In addition, the triple harmonic signal Vh1 is a triple harmonic signal of which the polarity is opposite to the polarity of the U-phase voltage command signal Vu at the timing at which the absolute value of the signal level of the U-phase voltage command signal Vu is maximum. Furthermore, the triple harmonic signal Vh2 is a triple harmonic signal of which the polarity is opposite to the polarity of the V-phase voltage command signal Vv at the timing at which the absolute value of the signal level of the V-phase voltage command signal Vv is maximum. Furthermore, the triple harmonic signal Vh2 is a triple harmonic signal of which the polarity is opposite to the polarity of the W-phase voltage command signal Vw at the timing at which the absolute value of the signal level of the W-phase voltage command signal Vw is maximum. That is, the triple harmonic signal Vh2 is a triple harmonic signal of which the polarity is opposite to the polarity of the phase voltage command signal of an intended phase at the timing at which the signal level of the phase voltage command signal of the intended phase is maximum.

In the example shown in the second top graph in FIG. 4, for example, (i) the absolute value of the signal level of the triple harmonic signal Vh1 is maximum at the timing (see white circles in FIG. 4) at which the signal level of the U-phase voltage command signal Vu is maximum, and (ii) at the timing at which the signal level of the U-phase voltage command signal Vu is maximum, the polarity of the signal level of the triple harmonic signal Vh1 is opposite to the polarity of the U-phase voltage command signal Vu. Similarly, for example, (i) the absolute value of the signal level of the triple harmonic signal Vh1 is maximum at the timing (see white squares in FIG. 4) at which the signal level of the V-phase voltage command signal Vv is maximum, and (ii) at the timing at which the signal level of the V-phase voltage command signal Vv is maximum, the polarity of the signal level of the triple harmonic signal Vh1 is opposite to the polarity of the V-phase voltage command signal Vv. Similarly, for example, (i) the absolute value of the signal level of the triple harmonic signal Vh1 is maximum at the timing (see white triangles in FIG. 4) at which the signal level of the W-phase voltage command signal Vw is maximum, and (ii) at the timing at which the signal level of the W-phase voltage command signal Vw is maximum, the polarity of the signal level of the triple harmonic signal Vh1 is opposite to the polarity of the W-phase voltage command signal Vw.

The harmonic generating unit 155 may generate the triple harmonic signal Vh1 by referencing the three-phase voltage command signals generated by the two phase/three phase conversion unit 154. For example, the harmonic generating unit 155 may generate the triple harmonic signal Vh1 by shifting the phase of a fundamental signal of a triple harmonic signal, defined by a parameter stored in a memory, or the like, on the basis of the phases of the three-phase voltage command signals generated by the two phase/three phase conversion unit 154. Alternatively, for example, the harmonic generating unit 155 may generate a fundamental signal of a triple harmonic signal by dividing the frequencies of the three-phase voltage command signals and generate the triple harmonic signal Vh1 by shifting the phase of the fundamental signal on the basis of the phases of the three-phase voltage command signals generated by the two phase/three phase conversion unit 154. The harmonic generating unit 155 may generate the triple harmonic signal Vh1 by using a selected method.

The triple harmonic signal Vh1 may be not a triple harmonic signal of which the absolute value of the signal level is maximum at the timing at which the absolute value of the signal level of at least one phase voltage command signal is maximum. Specifically, the triple harmonic signal Vh1 may be a triple harmonic signal of which the absolute value of the signal level is larger than zero at the timing at which the absolute value of the signal level of at least one phase voltage command signal is maximum. In other words, the triple harmonic signal Vh1 may be a triple harmonic signal of which the absolute value of the signal level is not zero at the timing at which the absolute value of the signal level of at least one phase voltage command signal is maximum. In this case, the triple harmonic signal Vh1 may be not a triple harmonic signal of which the absolute value of the signal level is minimum (for example, zero) at the timing at which the absolute value of the signal level of at least one phase voltage command signal is minimum (for example, zero). However, in this case as well, the triple harmonic signal Vh1 is a triple harmonic signal of which the polarity is opposite to the polarity of the phase voltage command signal of an intended phase at the timing at which the absolute value of the signal level of the phase voltage command signal of the intended phase is maximum. In order to generate the triple harmonic signal Vh1 of which the absolute value of the signal level is larger than zero at the timing at which the absolute value of the signal level of at least one phase voltage command signal is maximum, the harmonic generating unit 155 may shift the phase of the triple harmonic signal Vh1 of which the absolute value of the signal level is maximum at the timing at which the absolute value of the signal level of at least one phase voltage command signal is maximum (that is, the triple harmonic signal Vh1 shown in the second top graph in FIG. 4), by X° (where −90<X<90). However, the harmonic generating unit 155 may generate the triple harmonic signal Vh1 of which the absolute value of the signal level is larger than zero at the timing at which the absolute value of the signal level of at least one phase voltage command signal is maximum by using a selected method.

Next, the triple harmonic signal Vh2 will be described. As shown in the third top graph in FIG. 4, the triple harmonic signal Vh2, as well as the triple harmonic signal Vh1, is a triple harmonic signal of which the absolute value of the signal level is minimum (for example, zero) at the timing at which the absolute value of the signal level of at least one phase voltage command signal is minimum (for example, zero). In addition, the triple harmonic signal Vh2, as well as the triple harmonic signal Vh1, is a triple harmonic signal of which the absolute value of the signal level is maximum at the timing at which the absolute value of the signal level of at least one phase voltage command signal is maximum. On the other hand, different from the triple harmonic signal Vh1, the triple harmonic signal Vh2 is a triple harmonic signal of which the polarity is the same as the polarity of the phase voltage command signal of an intended phase at the timing at which the signal level of the phase voltage command signal of the intended phase is maximum. That is, the triple harmonic signal Vh2 differs from the triple harmonic signal Vh1 in that the polarity is inverted (in other words, the phase is shifted by 180°).

In the example shown in the third top graph in FIG. 4, for example, (i) the absolute value of the signal level of the triple harmonic signal Vh2 is maximum at the timing (see white circles in FIG. 4) at which the signal level of the U-phase voltage command signal Vu is maximum, and (ii) at the timing at which the signal level of the U-phase voltage command signal Vu is maximum, the polarity of the signal level of the triple harmonic signal Vh2 is the same as the polarity of the U-phase voltage command signal Vu. Similarly, for example, (i) the absolute value of the signal level of the triple harmonic signal Vh2 is maximum at the timing (see white squares in FIG. 4) at which the signal level of the V-phase voltage command signal Vv is maximum, and (ii) at the timing at which the signal level of the V-phase voltage command signal Vv is maximum, the polarity of the signal level of the triple harmonic signal Vh2 is the same as the polarity of the V-phase voltage command signal Vv. Similarly, for example, (i) the absolute value of the signal level of the triple harmonic signal, Vh2 is maximum at the timing (see white triangles in FIG. 4) at which the signal level of the W-phase voltage command signal Vw is maximum, and (ii) at the timing at which the signal level of the W-phase voltage command signal Vw is maximum, the polarity of the signal level of the triple harmonic signal Vh2 is the same as the polarity of the W-phase voltage command signal Vw.

The harmonic generating unit 155 may generate the triple harmonic signal Vh2 by referencing the three-phase voltage command signals generated by the two phase/three phase conversion unit 154. For example, the harmonic generating unit 155 may generate the triple harmonic signal Vh2 by shifting the phase of a fundamental signal of a triple harmonic signal, defined by a parameter stored in a memory, or the like, on the basis of the phases of the three-phase voltage command signals generated by the two phase/three phase conversion unit 154. Alternatively, for example, the harmonic generating unit 155 may generate a fundamental signal of a triple harmonic signal by dividing the frequencies of the three-phase voltage command signals and generate the triple harmonic signal Vh2 by shifting the phase of the fundamental signal on the basis of the phases of the three-phase voltage command signals generated by the two phase/three phase conversion unit 154. Alternatively, the harmonic generating unit 155 may generate the triple harmonic signal Vh2 by shifting the phase of the triple harmonic signal Vh1 by 180° (that is, inverting the polarity). The harmonic generating unit 155 may generate the triple harmonic signal Vh2 by using a selected method.

The triple harmonic signal Vh2 may be not a triple harmonic signal of which the absolute value of the signal level is maximum at the timing at which the absolute value of the signal level of at least one phase voltage command signal is maximum. Specifically, the triple harmonic signal Vh2 may be a triple harmonic signal (see the fourth top graph and the fifth top graph in FIG. 4) of which the absolute value of the signal level is larger than zero at the timing at which the absolute value of the signal level of at least one phase voltage command signal is maximum. In other words, the triple harmonic signal Vh2 may be a triple harmonic signal of which the absolute value of the signal level is not zero at the timing at which the absolute value of the signal level of at least one phase voltage command signal is maximum. In this case, the triple harmonic signal Vh2 may be not a triple harmonic signal of which the absolute value of the signal level is minimum (for example, zero) at the timing at which the absolute value of the signal level of at least one phase voltage command signal is minimum (for example, zero). However, in this case as well, the triple harmonic signal Vh2 is a triple harmonic signal of which the polarity is the same as the polarity of the phase voltage command signal of an intended phase at the timing at which the absolute value of the signal level of the phase voltage command signal of the intended phase is maximum. In order to generate the triple harmonic signal Vh2 of which the absolute value of the signal level is larger than zero at the timing at which the absolute value of the signal level of at least one phase voltage command signal is maximum, the harmonic generating unit 155 may shift the phase of the triple harmonic signal Vh2 of which the absolute value of the signal level is maximum at the timing at which the absolute value of the signal level of at least one phase voltage command signal is maximum (that is, the triple harmonic signal Vh2 shown in the third top graph in FIG. 4), by X° (where −90<X<90). However, the harmonic generating unit 155 may generate the triple harmonic signal Vh2 of which the absolute value of the signal level is larger than zero at the timing at which the absolute value of the signal level of at least one phase voltage command signal is maximum by using a selected method.

Referring back to FIG. 3, after that, the PWM conversion unit 157 generates the U-phase PWM signals Gup, Gun on the basis of a magnitude relation between the U-phase modulation signal Vmu and the carrier signal C (step S15). Similarly, the PWM conversion unit 157 generates the V-phase PWM signals Gvp, Gvn on the basis of a magnitude relation between the V-phase modulation signal Vmv and the carrier signal C (step S15). Similarly, the PWM conversion unit 157 generates the W-phase PWM signals Gwp, Gwn on the basis of a magnitude relation between the W-phase modulation signal Vmw and the carrier signal C (step S15). As a result, the inverter 13 is driven on the basis of the PWM signals.

With the above-described inverter control operation according to present embodiment, when the vehicle 1 is not traveling in the economy mode, the operation of the inverter 13 is controlled by using the triple harmonic signal Vh1. Thus, with the inverter control operation according to the present embodiment, in which the operation of the inverter 13 is controlled by using the triple harmonic signal Vh1, a ripple in the terminal voltage VH of the smoothing capacitor 12 is suitably reduced in comparison with the inverter control operation according a comparative embodiment, in which the operation of the inverter 13 is controlled without using the triple harmonic signal Vh1.

Furthermore, with the inverter control operation according to the present embodiment, when the vehicle 1 is traveling in the economy mode, the operation of the inverter 13 is controlled by using the triple harmonic signal Vh2. Thus, with the inverter control operation according to the present embodiment, in which the operation of the inverter 13 is controlled by using the triple harmonic signal Vh2, the loss in the inverter 13 is suitably reduced in comparison with the inverter control operation according to a comparative embodiment, in which the operation of the inverter 13 is controlled without using the triple harmonic signal Vh2. Hereinafter, the reason will be described with reference to FIG. 5 and FIG. 6. FIG. 5 shows graphs that respectively show the U-phase voltage command signal Vu, the triple harmonic signal Vh2, the U-phase modulation signal Vmu and the U-phase PWM signal Gup in the case where the operation of the inverter 13 is controlled by using the triple harmonic signal Vh2 that is generated when the vehicle 1 is traveling in the economy mode. FIG. 6 shows graphs that respectively show the U-phase voltage command signal Vu, the triple harmonic signal Vh1, the U-phase modulation signal Vmu and the U-phase PWM signal Gup in the case where the operation of the inverter 13 is controlled by using the triple harmonic signal Vh1 that is generated when the vehicle 1 is traveling in the economy mode.

In the following description, description will be made focusing on the U phase for the sake of convenience of description. Of course, the same applies to each of the V phase and the W phase.

Figure 5A:
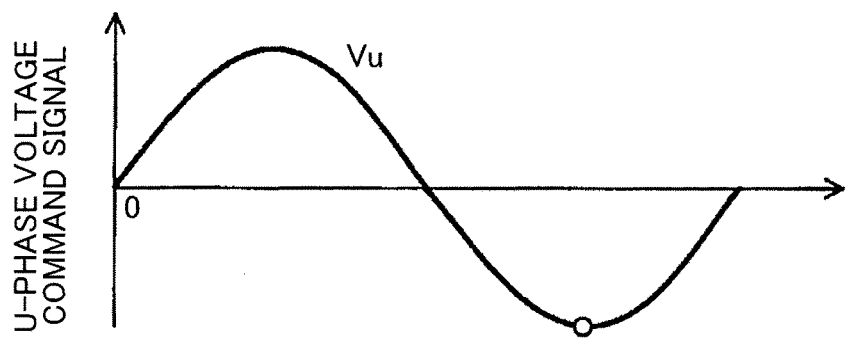
FIG. 5 shows graphs that respectively show a U-phase voltage command signal, a triple harmonic signal, a U-phase modulation signal and a U-phase PWM signal in the case where the operation of the inverter is controlled by using the triple harmonic signal that is generated when a vehicle is traveling in an economy mode.
Figure 5B:
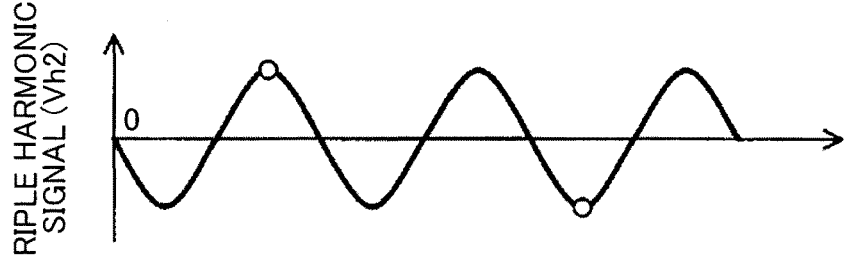
Figure 5C:
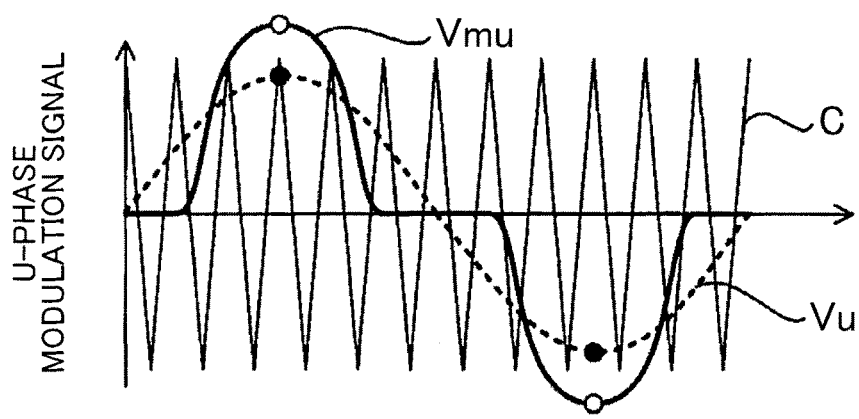

When the triple harmonic signal Vh2 shown in FIG. 5(b) is added to the U-phase voltage command signal Vu shown in FIG. 5(a), the U-phase modulation signal Vmu shown in FIG. 5(c) is generated. Here, as described above, the triple harmonic signal Vh2 is a triple harmonic signal of which the absolute value of the signal level is maximum and the polarity is the same as the polarity of the phase voltage command signal of an intended phase at the timing at which the signal level of the phase voltage command signal of the intended phase is maximum.

Thus, the absolute value of the peak value (white circles shown in FIG. 5(c)) of the signal level of the U-phase modulation signal Vmu is larger than the absolute value of the peak value (black circles in FIG. 5(c)) of the signal level of the U-phase voltage command signal Vu. Specifically, the maximum value of the signal level of the U-phase modulation signal Vmu is larger than the maximum value of the signal level of the U-phase voltage command signal Vu. In addition, the minimum value of the signal level of the U-phase modulation signal Vmu is smaller than the minimum value of the signal level of the U-phase voltage command signal Vu. That is, the triple harmonic signal Vh2 is a triple harmonic signal that functions such that the absolute value of the peak value of the signal level of the U-phase modulation signal Vmu is larger than the absolute value of the peak value of the signal level of the U-phase voltage command signal Vu.

In the present embodiment, the triple harmonic signal Vh2 has such a characteristic (for example, phase, amplitude, and the like) as to be able to increase the absolute value of the peak value of the signal level of the U-phase modulation signal Vmu above the absolute value of the peak value of the signal level of the carrier signal C. Specifically, the triple harmonic signal Vh2 has such a characteristic as to be able to increase the maximum value of the signal level of the U-phase modulation signal Vmu above the maximum value of the signal level of the carrier signal C. In addition, the triple harmonic signal Vh2 is desirably a triple harmonic signal that has such a characteristic as to be able to reduce the minimum value of the signal level of the U-phase modulation signal Vmu below the minimum value of the signal level of the carrier signal C.

Conversely, the harmonic generating unit 155 generates the triple harmonic signal Vh2 that has such a characteristic as to be able to increase the absolute value of the peak value of the signal level of the U-phase modulation signal Vmu above the absolute value of the peak value of the signal level of the carrier signal C at the time of generating the triple harmonic signal Vh2. In order to generate the triple harmonic signal Vh2 having such a characteristic, the harmonic generating unit 155 may adjust the amplitude of the fundamental signal of a triple harmonic signal (or the triple harmonic signal Vh1) in addition to or instead of shifting (that is, adjusting) the phase of the fundamental signal of the triple harmonic signal (or the triple harmonic signal Vh1) in accordance with the above-described mode.

Figure 5D:
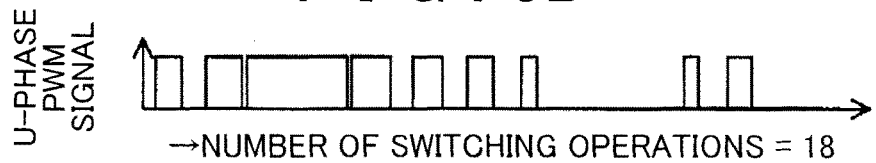

As a result, as shown in FIG. 5(c), the absolute value of the peak value of the signal level of the U-phase modulation signal Vmu is larger than the absolute value of the peak value of the signal level of the carrier signal C. Therefore, as shown in FIG. 5(d), when the triple harmonic signal Vh2 is used, the number of switching operations of each of the p-side switching element Qup and the n-side switching element Qun is, for example, S2 (in the example shown in FIG. 5(d), S2=18).

Figure 6A:
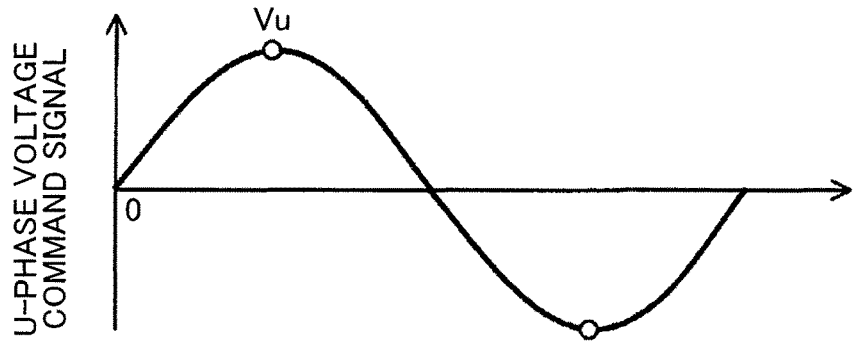
FIG. 6 shows graphs that respectively show the U-phase voltage command signal, the triple harmonic signal, the U-phase modulation signal and the U-phase PWM signal in the case where the operation of the inverter is controlled by using the triple harmonic signal that is generated when the vehicle is not traveling in the economy mode.
Figure 6B:
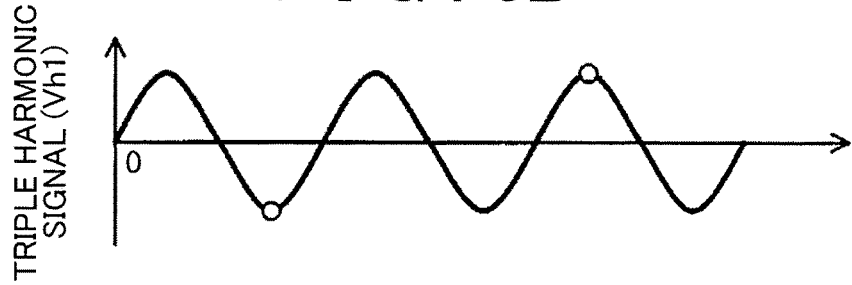
Figure 6C:
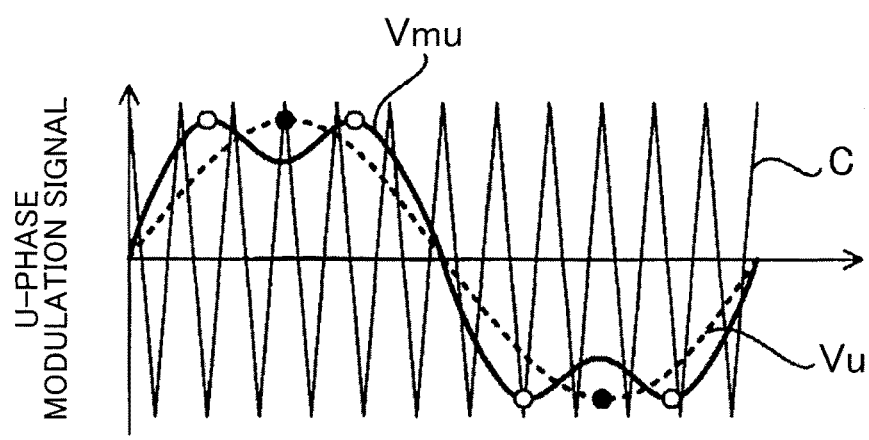

On the other hand, when the triple harmonic signal Vh1 shown in FIG. 6(b) is added to the U-phase voltage command signal Vu shown in FIG. 6(a) (which is the same as the U-phase voltage command signal Vu shown in FIG. 5(a)), the U-phase modulation signal Vmu shown in FIG. 6(c) is generated. Here, as described above, the triple harmonic signal Vh1 is a triple harmonic signal of which the absolute value of the signal level is maximum and the polarity is opposite to the polarity of the phase voltage command signal of an intended phase at the timing at which the signal level of the phase voltage command signal of the intended phase is maximum.

Thus, the absolute value of the peak value (white circles shown in FIG. 6(c)) of the signal level of the U-phase modulation signal Vmu is not larger than or is difficult to be larger than the absolute value of the peak value (black circles in FIG. 6(c)) of the signal level of the U-phase voltage command signal. Specifically, the maximum value of the signal level of the U-phase modulation signal Vmu is not larger or is difficult to be larger than the maximum value of the signal level of the U-phase voltage command signal Vu. In addition, the minimum value of the signal level of the U-phase modulation signal Vmu is not smaller or is difficult to be smaller than the minimum value of the signal level of the U-phase voltage command signal Vu.

Figure 6D:
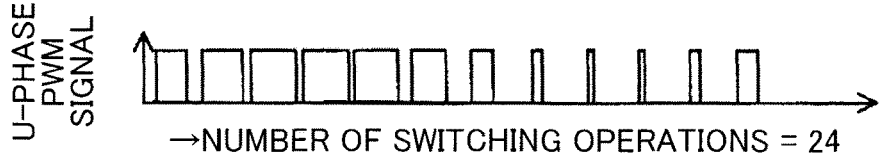

Therefore, as shown in FIG. 6(c), the absolute value of the peak value of the signal level of the U-phase modulation signal Vmu is not larger or is difficult to be larger than the absolute value of the peak value of the signal level of the carrier signal C. As a result, as shown in FIG. 6(d), when the triple harmonic signal Vh2 is used, the number of switching operations of each of the p-side switching element Qup and the n-side switching element Qun is, for example, S1 (where S1>S2, and in the example shown in FIG. 6(d), S1=24).

In this way, with the inverter control operation according to the present embodiment, in which the operation of the inverter 13 is controlled by using the triple harmonic signal Vh2, the number of switching operations of each of the switching elements of the inverter 13 in comparison with the inverter control operation according the comparative embodiment, in which the operation of the inverter 13 is controlled without using the triple harmonic signal Vh2. A reduction in the number of switching operations of each of the switching elements leads to a reduction in the loss of the inverter 13 including the switching elements. Thus, with the inverter control operation according to the present embodiment, in which the operation of the inverter 13 is controlled by using the triple harmonic signal Vh2, the loss of the inverter 13 is suitably reduced in comparison with the inverter control operation according the comparative embodiment, in which the operation of the inverter 13 is controlled without using the triple harmonic signal Vh2.

In addition, in the present embodiment, the ECU 15 controls the operation of the inverter 13 by using the triple harmonic signal Vh2 by which it is possible to exhibit the advantageous effect that the loss of the inverter 13 is reduced in the case where the current drive mode of the vehicle 1 is the economy mode. On the other hand, the ECU 15 controls the operation of the inverter 13 by using the triple harmonic signal Vh1 by which it is possible to exhibit the advantageous effect that a ripple in the terminal voltage VH of the smoothing capacitor 12 is reduced in the case where the current drive mode of the vehicle 1 is not the economy mode. When the operation of the inverter 13 is controlled by using the triple harmonic signal Vh2, the loss of the inverter 13 decreases, whereas there is a concern that a ripple in the terminal voltage VH of the smoothing capacitor 12 increases. On the other hand, a ripple in the terminal voltage VH is relatively small in the case where the current drive mode of the vehicle 1 is the economy mode (or the output of the three-phase alternating-current motor 14 is relatively low) as compared to the case where the current drive mode of the vehicle 1 is not the economy mode (or the power of the three-phase alternating-current motor 14 is relatively high). Alternatively, the influence due to an increase in a ripple in the terminal voltage VH reduces in the case where the current drive mode of the vehicle 1 is the economy mode (or the output of the three-phase alternating-current motor 14 is relatively low) as compared to the case where the current drive mode of the vehicle 1 is not the economy mode (or the power of the three-phase alternating-current motor 14 is relatively high). Thus, in the present embodiment, the ECU 15 is able to control the operation of the inverter 13 by using the triple harmonic signal Vh2 in order to give a higher priority to a reduction in the loss of the inverter 13 over a reduction in a ripple in the terminal voltage VH in a situation that a ripple in the terminal voltage VH is relatively small or the influence due to an increase in a ripple in the terminal voltage VH is relatively small. On the other hand, the ECU 15 is able to control the operation of the inverter 13 by using the triple harmonic signal Vh1 in order to give a higher priority to a reduction in a ripple in the terminal voltage VH over a reduction in the loss of the inverter 13 in a situation that a ripple in the terminal voltage VH is relatively large or the influence due to an increase in a ripple in the terminal voltage VH is relatively large. As a result, the ECU 15 is able to control the operation of the inverter 13 such that a ripple in the terminal voltage VH is reduced while the loss of the inverter 13 is reduced.

However, the ECU 15 may control the operation of the inverter 13 by using the triple harmonic signal Vh2 by which it is possible to exhibit the advantageous effect that the loss of the inverter 13 is reduced irrespective of the current drive mode of the vehicle 1 (or irrespective of the output of the three-phase alternating-current motor 14). In this case, the ECU 15 does not need to execute the operations associated with the triple harmonic signal Vh1 (for example, the operations in step S12 to step S14 in FIG. 3).

When the technical advantageous effect that is obtained from the triple harmonic signal Vh2 is taken into consideration, the triple harmonic signal Vh2 may be regarded as a triple harmonic signal that has such a characteristic as to function to increase the absolute value of the peak value of the signal level of each of the three-phase modulation signals above the absolute value of the peak value of the signal level of the carrier signal C. That is, the triple harmonic signal Vh2 may be regarded as a triple harmonic signal that has such a characteristic as to function to increase the absolute value of the peak value of the signal level of the U-phase modulation signal Vmu above the absolute value of the peak value of the signal level of the carrier signal C. Similarly, the triple harmonic signal Vh2 may be regarded as a triple harmonic signal that has such a characteristic as to function to increase the absolute value of the peak value of the signal level of the V-phase modulation signal Vmv above the absolute value of the peak value of the signal level of the carrier signal C. Similarly, the triple harmonic signal Vh2 may be regarded as a triple harmonic signal that has such a characteristic as to function to increase the absolute value of the peak value of the signal level of the W-phase modulation signal Vmw above the absolute value of the peak value of the signal level of the carrier signal C. Thus, the triple harmonic signal Vh2 is not limited to the triple harmonic signal illustrated in FIG. 4 and may be any triple harmonic signal having such a characteristic.

Figure 7:
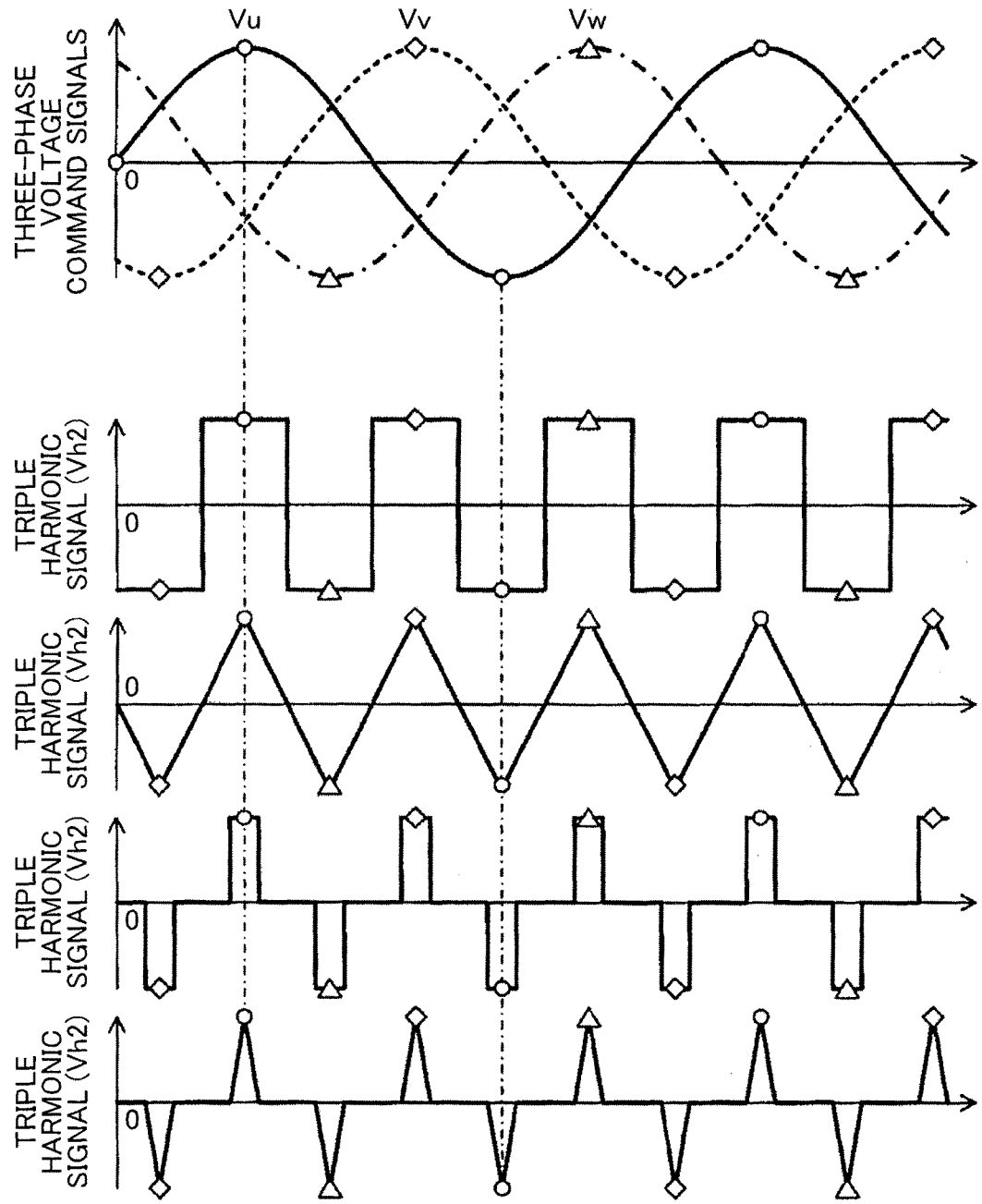
FIG. 7 is a graph that shows other examples of the triple harmonic signal together with the three-phase voltage command signals.

In the above description, the triple harmonic signal Vh2 is a sinusoidal wave (see FIG. 4). However, the triple harmonic signal Vh2 may be any alternating-current signal having a frequency that is three times as high as the three-phase voltage command signal. For example, as shown in the second top graph and the fourth top graph in FIG. 7, the triple harmonic signal Vh2 may be a rectangular wave (so-called pulse wave) signal. Alternatively, for example, as shown in the third top graph and the fifth top graph in FIG. 7, the triple harmonic signal Vh2 may be a triangular wave signal. Alternatively, the triple harmonic signal Vh2 may be a signal having another shape, such as a sawtooth wave. In short, the triple harmonic signal Vh2 may be a signal in which the same waveform pattern (desirably, the same waveform pattern of which the signal level varies) periodically appears in a period corresponding to the frequency that is three times as high as the frequency of each of the three-phase voltage command signals or three-phase current values. The same applies to the triple harmonic signal Vh1.

In the above description, the vehicle 1 includes the single motor generator 14. However, the vehicle 1 may include a plurality of the motor generators 14. In this case, the vehicle 1 desirably includes the inverter 13 for each motor generator 14. In this case, the ECU 15 may execute the above-described inverter control operation individually for each inverter 13. Alternatively, the vehicle 1 may further include an engine in addition to the motor generator 14. That is, the vehicle 1 may be a hybrid vehicle.

In the above description, the inverter 13 and the motor generator 14 are mounted on the vehicle 1. However, the inverter 13 and the motor generator 14 may be mounted on any device other than the vehicle 1 (for example, a device that operates by using the inverter 13 and the motor generator 14, and, for example, an air conditioner, or the like). Even when the inverter 13 and the motor generator 14 are mounted on any device other than the vehicle 1, of course, the above-described various advantageous effects are obtained.

The invention is not limited to the above-described embodiment. The invention may be modified as needed within the scope of the invention read from the appended claims and the whole specification or without departing from the concept of the invention. The technical scope of the invention also encompasses an electric motor control apparatus including such modifications.

What is claimed is:

1. An electric motor control apparatus that controls an electric motor system including a direct-current power supply, a power converter and a three-phase alternating-current motor, the power converter including switching elements that convert a direct-current power to alternating-current powers, the direct-current power being supplied from the direct-current power supply, the three-phase alternating current motor being driven by using the alternating-current powers that are output from the power converter, the electric motor control apparatus comprising:

an ECU configured to determine a current drive mode; and a generating device configured to generate, in each phase of the three-phase alternating-current motor, a modulation signal by adding a triple harmonic signal to a phase voltage command signal that defines an operation of the three-phase alternating-current motor, an amplitude of the phase voltage command signal being smaller than an amplitude of a carrier signal, and an amplitude of the modulation signal being larger than the amplitude of the carrier signal, wherein the ECU is configured to control an operation of the power converter by controlling the switching elements on the basis of a magnitude relation between each of the modulation signals and the carrier signal having a predetermined frequency, wherein a phase of the triple harmonic signal is shifted based on the drive mode, and wherein the triple harmonic signal includes a signal component of which (i) the absolute value of the signal level is larger than zero and (ii) the polarity of the signal level is the same as the polarity of at least one phase voltage command signal, at timing at which the absolute value of the signal level of the at least one phase voltage command signal is maximum.

2. The electric motor control apparatus according to claim 1, wherein the triple harmonic signal includes a signal component of which (i) the absolute value of a signal level is maximum and (ii) the polarity of the signal level is the same as the polarity of at least one phase voltage command signal, at timing at which the absolute value of the signal level of the at least one phase voltage command signal is maximum.

3. The electric motor control apparatus according to claim 1,
wherein the triple harmonic signal includes at least one of (i) a first signal component of which (i-1) the absolute value of a signal level is maximum and (i-2) the polarity of the signal level is the same as the polarity of at least one phase voltage command signal, at timing at which the absolute value of the signal level of the at least one phase voltage command signal is maximum, and (ii) a second signal component that is obtained by shifting the phase of the first signal component by X° (where −90<X<90).

4. The electric motor control apparatus according to claim 1,
wherein the electric motor system is mounted on a vehicle, and
the generating device generates each modulation signal by adding the corresponding triple harmonic signal to the corresponding phase voltage command signal when an output of the three-phase alternating-current motor, which is required to propel the vehicle, is lower than or equal to a predetermined value.

5. The electric motor control apparatus according to claim 1,
wherein the electric motor system is mounted on a vehicle, and
the generating device generates each modulation signal by adding the corresponding triple harmonic signal to the corresponding phase voltage command signal when the vehicle is traveling in a fuel economy drive mode in which fuel economy performance is given a higher priority than driving performance.

6. The electric motor control apparatus according to claim 1, further comprising:
an adjusting device configured to adjust a characteristic of the triple harmonic signal such that the absolute value of the peak value of the signal level of the corresponding modulation signal is larger than the absolute value of the peak value of the signal level of the carrier signal in a corresponding one of phases of the three-phase alternating-current motor.

7. The electric motor control apparatus according to claim 6, wherein the characteristic of each of the triple harmonic signals includes at least one of the phase and amplitude of the triple harmonic signal.

8. An electric motor control method that controls an electric motor system including a direct-current power supply, a power converter and a three-phase alternating-current motor, the power converter including switching elements that convert a direct-current power to alternating-current powers, the direct-current power being supplied from the direct-current power supply, the three-phase alternating-current motor being driven by using the alternating-current powers that are output from the power converter, the electric motor control method comprising:
determining a current drive mode;
generating modulation signals by respectively adding a triple harmonic signal to phase voltage command signals that define an operation of the three-phase alternating-current motor, an amplitude of the phase voltage command signal being smaller than an amplitude of a carrier signal, and an amplitude of the modulation signal being larger than the amplitude of the carrier signal; and
controlling an operation of the power converter by controlling the switching elements on the basis of a magnitude relation between each of the modulation signals and a carrier signal having a predetermined frequency,
wherein a phase of the triple harmonic signal is shifted based on the drive mode, and
wherein the triple harmonic signal includes a signal component of which (i) the absolute value of the signal level is larger than zero and (ii) the polarity of the signal level is the same as the polarity of at least one phase voltage command signal, at timing at which the absolute value of the signal level of the at least one phase voltage command signal is maximum.

* * * * *